United States Patent
Al Majid et al.

(10) Patent No.: US 12,056,441 B2
(45) Date of Patent: Aug. 6, 2024

(54) ANNOTATING A COLLECTION OF MEDIA CONTENT ITEMS

(71) Applicant: Snap Inc., Santa Monica, CA (US)

(72) Inventors: Newar Husam Al Majid, New York, NY (US); Wisam Dakka, San Francisco, CA (US); Donald Giovannini, Venice, CA (US); Andre Madeira, Saratoga, CA (US); Seyed Reza Mir Ghaderi, San Francisco, CA (US); Yaming Lin, Palo Alto, CA (US); Yan Wu, Milbrae, CA (US); Ranveer Kunal, San Francisco, CA (US); Aymeric Damien, London (GB); Maryam Daneshi, Redwood City, CA (US); Yi Liu, Moraga, CA (US)

(73) Assignee: Snap Inc., Santa Monica, CA (US)

( * ) Notice: Subject to any disclaimer, the term of this patent is extended or adjusted under 35 U.S.C. 154(b) by 21 days.

(21) Appl. No.: 17/479,383

(22) Filed: Sep. 20, 2021

(65) Prior Publication Data

US 2022/0004703 A1    Jan. 6, 2022

Related U.S. Application Data

(63) Continuation of application No. 15/941,743, filed on Mar. 30, 2018, now Pat. No. 11,163,941.

(51) Int. Cl.
*G06F 40/169* (2020.01)
*G06F 16/2457* (2019.01)
(Continued)

(52) U.S. Cl.
CPC ...... *G06F 40/169* (2020.01); *G06F 16/24578* (2019.01); *G06F 16/41* (2019.01); *G06F 16/487* (2019.01); *G06F 16/489* (2019.01)

(58) Field of Classification Search
CPC .. G06F 16/24578; G06F 16/41; G06F 16/487; G06F 16/489; G06F 16/48; G06F 40/169
See application file for complete search history.

(56) References Cited

U.S. PATENT DOCUMENTS

| 666,223 A | 1/1901 | Shedlock |
|---|---|---|
| 4,581,634 A | 4/1986 | Williams |

(Continued)

FOREIGN PATENT DOCUMENTS

| CA | 2887596 A1 | 7/2015 |
|---|---|---|
| EP | 2051480 A1 | 4/2009 |

(Continued)

OTHER PUBLICATIONS

Y. Feng and M. Lapata, "Automatic Caption Generation for News Images," in IEEE Transactions on Pattern Analysis and Machine Intelligence, vol. 35, No. 4, pp. 797-812, Apr. 2013 (Year: 2013).*

(Continued)

*Primary Examiner* — Dennis Truong
(74) *Attorney, Agent, or Firm* — Schwegman Lundberg & Woessner, P.A.

(57) ABSTRACT

Various embodiments provide for systems, methods, and computer-readable storage media for annotating a collection of media items, such as digital images. According to some embodiments, an annotation system automatically determines one or more annotations for a plurality of media content items, and generates a collection of media content items that associates the determined annotations with the plurality of media content items. Depending on the embodiment, annotations that may be determined for the plurality of media content (and associated with the collection for the media content items) can include, without limitation, a (Continued)

caption, a geographic location, a category, a novelty measurement, an event, and a highlight media content item representing the collection.

17 Claims, 10 Drawing Sheets

(51) Int. Cl.
*G06F 16/41* (2019.01)
*G06F 16/48* (2019.01)
*G06F 16/487* (2019.01)

(56) References Cited

U.S. PATENT DOCUMENTS

| | | | |
|---|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2* | 3/2009 | Toyama ............... H04L 67/306 348/211.3 |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,617,176 B2* | 11/2009 | Zeng ..................... G06F 16/951 |
| 7,639,943 B1 | 12/2009 | Kalajan |
| 7,650,231 B2 | 1/2010 | Gadler |
| 7,668,537 B2 | 2/2010 | DeVries |
| 7,739,304 B2* | 6/2010 | Naaman ................ G06Q 10/06 707/767 |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Loffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |

(56) References Cited

U.S. PATENT DOCUMENTS

| | | |
|---|---|---|
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,563 B1 * | 12/2014 | Jing ............... G06V 20/10 706/22 |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,110,985 B2 * | 8/2015 | Boscolo ............... G06F 16/958 |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,195,912 B1 * | 11/2015 | Huang ............... G06F 16/51 |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,817,883 B2 * | 11/2017 | Barthel ............... G06F 16/489 |
| 9,854,219 B2 | 12/2017 | Sehn |
| 10,089,399 B2 * | 10/2018 | Gadepalli ............. G06F 16/248 |
| 10,515,379 B2 * | 12/2019 | Gupta ............... G06Q 30/0201 |
| 11,163,941 B1 | 11/2021 | Al Majid et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0182541 A1 * | 8/2007 | Harris ............... H04L 67/54 340/541 |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |

(56) References Cited

U.S. PATENT DOCUMENTS

| | | |
|---|---|---|
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0063455 A1* | 3/2009 | Li ................. G06F 16/951 707/999.005 |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254540 A1* | 10/2009 | Musgrove ........... G06F 16/951 707/999.005 |
| 2009/0265647 A1 | 10/2009 | Martin et al. |
| 2009/0288022 A1 | 11/2009 | Almstrand et al. |
| 2009/0290812 A1* | 11/2009 | Naaman ............. G06V 10/763 382/305 |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145327 A1* | 6/2011 | Stewart ............... G06F 16/4387 709/217 |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0194761 A1* | 8/2011 | Wang ..................... G06F 16/54 382/209 |
| 2011/0196737 A1* | 8/2011 | Vadlamani .......... G06F 16/9538 707/769 |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0235858 A1* | 9/2011 | Hanson .................... G06F 18/23 382/103 |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0302103 A1* | 12/2011 | Carmel .................. G06Q 10/10 705/347 |
| 2011/0314419 A1 | 12/2011 | Dunn et al. |
| 2011/0320373 A1 | 12/2011 | Lee et al. |
| 2012/0011433 A1* | 1/2012 | Skrenta ................ G06F 16/951 715/234 |
| 2012/0028659 A1 | 2/2012 | Whitney et al. |
| 2012/0030018 A1* | 2/2012 | Passmore ............. G06Q 30/02 707/754 |

(56) References Cited

U.S. PATENT DOCUMENTS

| | | |
|---|---|---|
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0066219 A1* | 3/2012 | Naaman ............... G06F 16/29 707/E17.026 |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0136985 A1* | 5/2012 | Popescu ............... G06Q 50/01 709/224 |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0031093 A1* | 1/2013 | Ishida ............... G06Q 30/0269 707/E17.089 |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0110978 A1* | 5/2013 | Gordon ............... H04N 21/4788 709/218 |
| 2013/0111514 A1 | 5/2013 | Slavin et al. |
| 2013/0128059 A1 | 5/2013 | Kristensson |
| 2013/0129142 A1* | 5/2013 | Miranda-Steiner ..... G06F 16/78 382/103 |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0202198 A1* | 8/2013 | Adam ............... G06V 20/10 382/159 |
| 2013/0204825 A1* | 8/2013 | Su ............... G06N 5/02 706/46 |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0297581 A1* | 11/2013 | Ghosh ............... G06F 16/951 707/706 |
| 2013/0297694 A1* | 11/2013 | Ghosh ............... G06F 16/34 709/204 |
| 2013/0304646 A1 | 11/2013 | De Geer |
| 2013/0304818 A1* | 11/2013 | Brumleve ............... G06Q 50/01 709/204 |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0040371 A1* | 2/2014 | Gurevich ............... H04W 4/029 709/204 |
| 2014/0043204 A1 | 2/2014 | Basnayake et al. |
| 2014/0045530 A1 | 2/2014 | Gordon et al. |
| 2014/0046914 A1* | 2/2014 | Das ............... G06F 16/583 707/694 |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1* | 6/2014 | Hogeg ............... H04N 21/4788 715/255 |
| 2014/0173457 A1 | 6/2014 | Wang et al. |

(56) References Cited

U.S. PATENT DOCUMENTS

| | | |
|---|---|---|
| 2014/0189592 A1 | 7/2014 | Benchenaa et al. |
| 2014/0201227 A1* | 7/2014 | Hamilton-Dick ... G06F 16/9535 707/758 |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1* | 9/2014 | Pridmore ............. G06F 16/248 709/204 |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0025977 A1* | 1/2015 | Doyle ............... G06Q 30/0269 705/14.66 |
| 2015/0046278 A1 | 2/2015 | Pei et al. |
| 2015/0046436 A1* | 2/2015 | Li .......................... G06Q 30/02 707/723 |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0186368 A1* | 7/2015 | Zhang ................. G06F 16/7867 707/740 |
| 2015/0222814 A1 | 8/2015 | Li et al. |
| 2015/0227840 A1* | 8/2015 | Codella ................ G06F 16/583 706/55 |
| 2015/0261917 A1 | 9/2015 | Smith |
| 2015/0312184 A1 | 10/2015 | Langholz et al. |
| 2015/0331945 A1* | 11/2015 | Lytkin ................ G06F 16/9535 707/722 |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0042249 A1* | 2/2016 | Babenko ................ G06V 20/46 382/224 |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2016/0359993 A1 | 12/2016 | Hendrickson et al. |
| 2017/0006094 A1 | 1/2017 | Abou Mahmoud et al. |
| 2017/0061308 A1 | 3/2017 | Chen et al. |
| 2017/0132230 A1* | 5/2017 | Muralidhar ......... G06F 16/9535 |
| 2017/0161618 A1* | 6/2017 | Swaminathan ......... G06F 16/23 |
| 2017/0200065 A1* | 7/2017 | Wang .................... G06V 10/764 |
| 2017/0287006 A1 | 10/2017 | Azmoodeh et al. |
| 2017/0352050 A1* | 12/2017 | Nixon ................. G06Q 30/0218 |
| 2019/0138617 A1* | 5/2019 | Farre Guiu ......... G06F 16/9535 |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/941,743, Advisory Action dated Aug. 10, 2020", 5 pgs.

"U.S. Appl. No. 15/941,743, Examiner Interview Summary dated Jul. 15, 2020", 3 pgs.

"U.S. Appl. No. 15/941,743, Examiner Interview Summary dated Dec. 21, 2020", 3 pgs.

"U.S. Appl. No. 15/941,743, Final Office Action dated Mar. 17, 2021", 16 pgs.

"U.S. Appl. No. 15/941,743, Final Office Action dated May 20, 2020", 17 pgs.

"U.S. Appl. No. 15/941,743, Non Final Office Action dated Sep. 28, 2020", 14 pgs.

"U.S. Appl. No. 15/941,743, Non Final Office Action dated Dec. 26, 2019", 15 pgs.

"U.S. Appl. No. 15/941,743, Notice of Allowance dated Jul. 1, 2021", 9 pgs.

"U.S. Appl. No. 15/941,743, Response filed Mar. 19, 2020 to Non Final Office Action dated Dec. 26, 2019", 15 pgs.

"U.S. Appl. No. 15/941,743, Response filed May 17, 2021 to Final Office Action dated Mar. 17, 2021", 16 pages.

"U.S. Appl. No. 15/941,743, Response filed Jul. 16, 2020 to Final Office Action dated May 20, 2020", 16 pgs.

"U.S. Appl. No. 15/941,743, Response filed Dec. 21, 2020 to Non Final Office Action dated Sep. 28, 2020", 15 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

(56) References Cited

OTHER PUBLICATIONS

"InstaPlace Photo App Tell the Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

"U.S. Appl. No. 15/941,743, Corrected Notice of Allowability dated Oct. 8, 2021".

U.S. Appl. No. 15/941,743, filed Mar. 30, 2018, Annotating a Collection of Media Content Items.

\* cited by examiner

ANNOTATING A COLLECTION OF MEDIA CONTENT ITEMS

This application is a continuation of and claims the benefit of priority of U.S. patent application Ser. No. 15/941,743, filed Mar. 30, 2018, which is hereby incorporated by reference in its entirety.

TECHNICAL FIELD

Technical Field

Embodiments described herein relate to media content and, more particularly, but not by way of limitation, to systems, methods, devices, and instructions for annotating a collection of media content items.

Background

Mobile devices, such as smartphones, are often used to generate media content items that can include, without limitation, text messages, digital images (e.g., photographs), videos, and animations. A plurality of messages can be organized into a collection (e.g., gallery) of messages, which an individual can share with other individuals over a network, such as through a social network.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

DETAILED DESCRIPTION

Various embodiments provide systems, methods, devices, and instructions for annotating a collection of media content items (e.g., story or gallery of media content items). According to some embodiments, an annotation system automatically determines one or more annotations for a plurality of media content items, and generates a collection of media content items that associates the determined annotations with the plurality of media content items. Depending on the embodiment, annotations that may be determined for the plurality of media content (and associated with the collection for the media content items) can include, without limitation, a caption (e.g., single word or phrase), a geographic location, a category, a novelty measurement, an event (e.g., periodic event, ongoing event, or concluded event), and a highlight media content item (e.g., for representing the collection). One or more other annotations may be determined by the annotation system. For some embodiments, the plurality of media content items being processed (e.g., implemented into an annotated collection of media content items) is automatically identified using algorithms or rules that groups (e.g., clusters or curates) the plurality of media content items from a larger plurality of media content items (e.g., stored on a media content item database) based on various factors or concepts (e.g., topics, events, places, celebrities, space/time proximity, media sources, breaking news, etc.). By annotating collections of media content items, various embodiments can improve a computing device ability to search for, organize, or present, such collections based on one or more of their determined characteristics.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
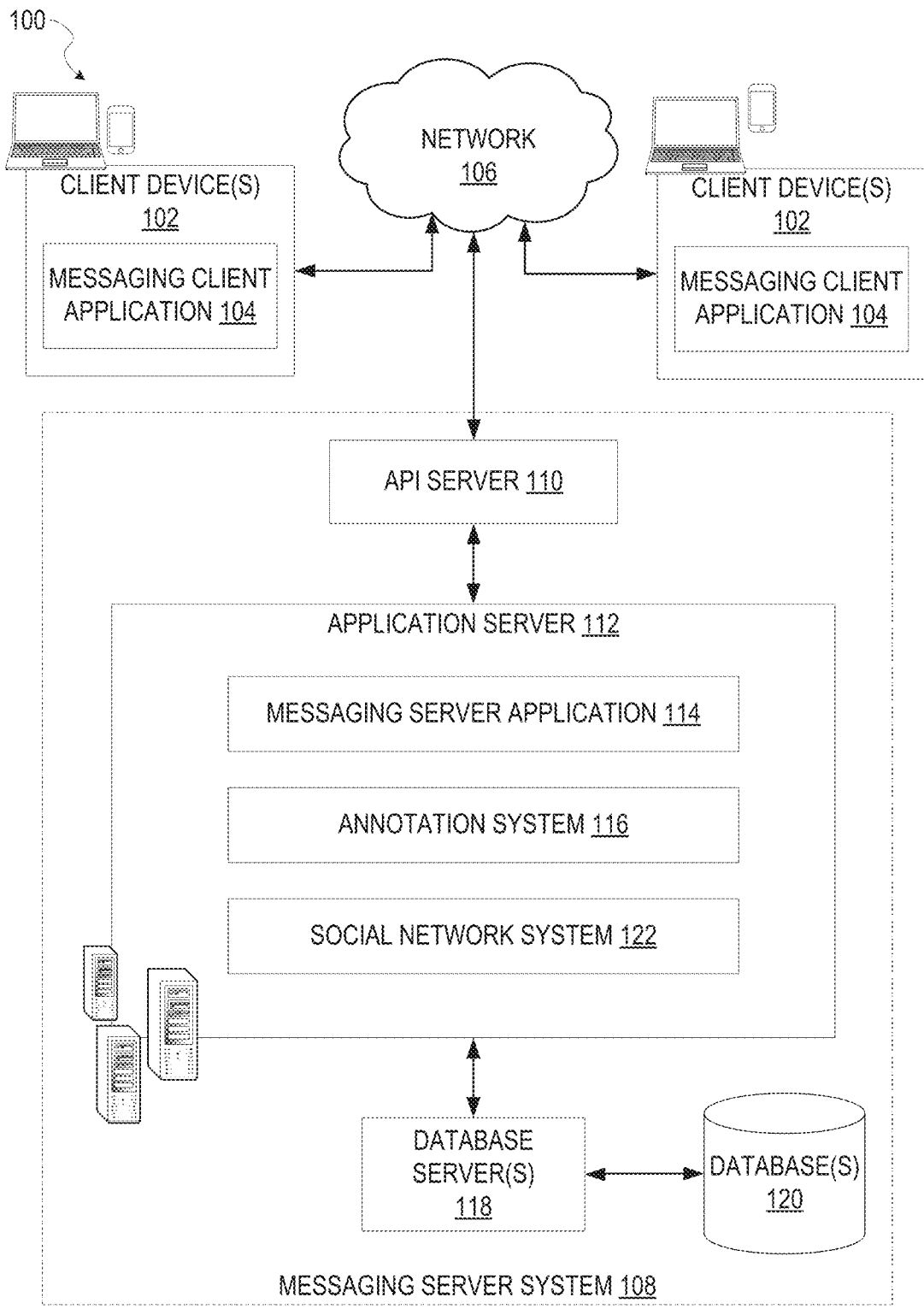
FIG. 1 is a block diagram showing an example messaging system, for exchanging data (e.g., messages and associated content) over a network that can include an annotation system, according to some embodiments.

FIG. 1 is a block diagram showing an example messaging system 100, for exchanging data (e.g., messages and associated content) over a network 106, which can include an annotation system, according to some embodiments. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages (e.g., collections of messages) processed by the application server 112.

Dealing specifically with the Application Program Interface (API) server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., digital images or video) from a messaging client application 104 to the messaging server application 114, and for possible access by another messaging client application 104; the setting of a collection of media content items (e.g., story), the retrieval of a list of friends of a user of a client device 102; the retrieval of such collections; the retrieval of messages and content, the adding and deletion of friends to a social graph; the location of friends within a social graph; and opening an application event (e.g., relating to the messaging client application 104).

The application server 112 hosts a number of applications, systems, and subsystems, including a messaging server application 114, an annotation system 116, and a social network system 122. The messaging server application 114 implements a number of message processing technologies and functions, particularly related to the aggregation and other processing of media content items (e.g., textual and multimedia content items) included in messages received from multiple instances of the messaging client application 104. As will be described herein, media content items from multiple sources may be aggregated into collections of media content items (e.g., stories or galleries), which may be automatically annotated by various embodiments described herein. For example, the collections of media content items can be annotated by associating the collections with captions, geographic locations, categories, novelty measurements, events, highlight media content items, and the like. The collections of media content items can be made available for access, by the messaging server application 114, to the messaging client application 104. Other processor- and memory-intensive processing of data may also be performed server-side by the messaging server application 114, in view of the hardware requirements for such processing.

The application server 112 also includes the annotation system 116 that is dedicated to performing various image processing operations, typically with respect to digital images or video received within the payload of a message at the messaging server application 114.

The social network system 122 supports various social networking functions and services, and makes these functions and services available to the messaging server application 114. To this end, the social network system 122 maintains and accesses an entity graph 304 (FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
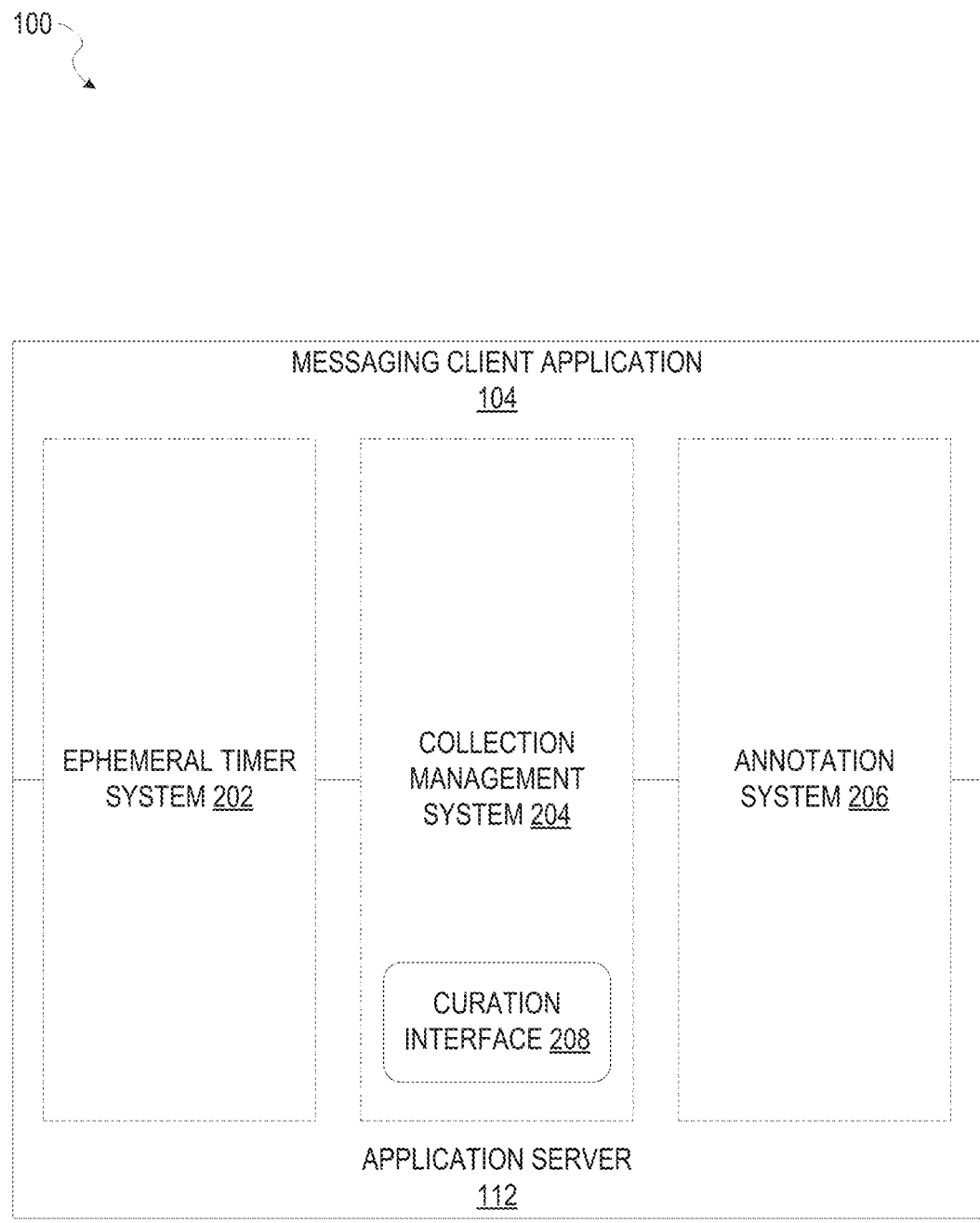
FIG. 2 is block diagram illustrating further details regarding a messaging system that includes an annotation system, according to some embodiments.

FIG. 2 is block diagram illustrating further details regarding the messaging system 100 that includes an annotation system 206, according to some embodiments. Specifically, the messaging system 100 is shown to comprise the messaging client application 104 and the application server 112, which in turn embody a number of some subsystems, namely an ephemeral timer system 202, a collection management system 204, and the annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media content items (e.g., collections of text, image, video, and audio data), which may be initially user curated or automatically generated based on various factors or concepts (e.g., topics, events, places, celebrities, space/time proximity, media sources, breaking news, etc.) and then annotated as described herein. In some examples, a collection of media content items (e.g., messages, including digital images, video, text, and audio) may be organized into a "gallery," such as an "event gallery" or an "event story." Such a collection may be made available for a specified time period, such as the duration of an event to which the media content items relate. For example, media content items relating to a music concert may be made available as a "story" for the duration of that music concert. The collection management system 204 may also be responsible for publishing an icon that provides notification of the existence of a particular collection to the user interface of the messaging client application 104. According to some embodiments, the icon comprises one or more media content items from the collection that are identified as highlighted media content items for the collection as described herein.

The collection management system 204 furthermore includes a curation interface 208 that allows a collection manager to manage and curate a particular collection of media content items. For example, the curation interface 208 enables an event organizer to curate a collection of media content items relating to a specific event (e.g., delete inappropriate media content items or redundant messages). Additionally, the collection management system 204 employs machine vision (or image recognition technology) and media content item rules to automatically curate a media content item collection. In certain embodiments, compensation may be paid to a user for inclusion of user-generated media content items into a collection. In such cases, the curation interface 208 operates to automatically make payments to such users for the use of their media content items.

The annotation system 206 determines one or more annotations for a plurality of media content items, and generates a collection of media content items that associates the determined annotations with the plurality of media content items as described herein. Depending on the embodiment, annotations that may be determined for the plurality of media content (and associated with the collection for the media content items) can include, without limitation, a caption, a geographic location, a category, a novelty measurement, an event, and a highlight media content item (e.g., for representing the collection). For some embodiments, the annotation system 206 determines a particular caption for a plurality of media content items by selecting the particular caption from a set of captions, where the set of captions being extracted from the plurality of media content items. The annotation system 206 determines a particular geographic location for the plurality of media content items. The annotation system 206 determines a particular category for the plurality of media content items based on at least one of analysis of a set of visual labels identified for the plurality of media content items, or analysis of at least one caption in the set of captions. The annotation system 206 generates a collection of media content items that comprises the plurality of media content items and collection annotation data that at least associates the collection with the particular caption, with the particular geographic location, and with the particular category. The annotation system 206 provides the collection of media content items to a client device for access by a user at the client device.

Figure 3:
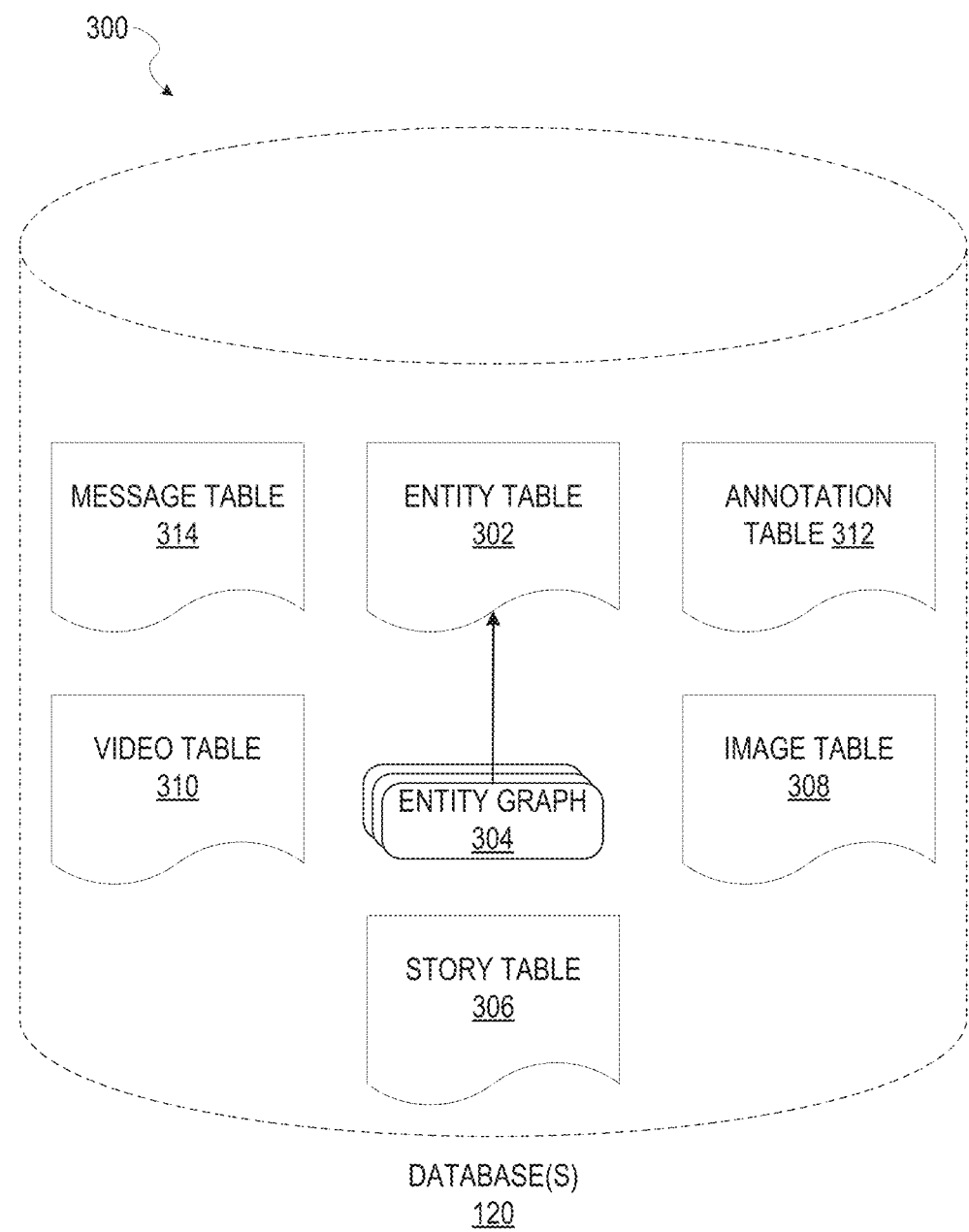
FIG. 3 is a schematic diagram illustrating data which may be stored in the database of the messaging system, according to some embodiments.

FIG. 3 is a schematic diagram illustrating data 300 which may be stored in the database 120 of the messaging server system 108, according to certain embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interest-based or activity-based, merely for example.

In an annotation table 312, the database 120 also stores annotation data, such as annotations applied to a message or a collection of media content items. As described herein, annotations applied to a collection of media content items can include, without limitation, a caption (e.g., single word or phrase), a geographic location, a category, a novelty measurement, an event (e.g., periodic event, ongoing event, or concluded event), and a highlight media content item (e.g., for representing the collection). Annotations applied to a message may include, for example, filters, media overlays, texture fills and sample digital images in an annotation table 312. Filters, media overlays, texture fills, and sample digital images for which data is stored within the annotation table 312 are associated with and applied to videos (for which data is stored in a video table 310) or digital images (for which data is stored in an image table 308). In one example, an image overlay can be displayed as overlaid on a digital image or video during presentation to a recipient user. For example, a user may append a media overlay on a selected portion of the digital image, resulting in presentation of an annotated digital image that includes the media overlay over the selected portion of the digital image. In this way, a media overlay can be used, for example, as a digital sticker or a texture fill that a user can use to annotate or otherwise enhance a digital image, which may be captured by a user (e.g., photograph).

Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection of media content items (e.g., a story or a gallery). The creation of a particular collection may be initiated by a particular user (e.g., each user for which a record is maintained in the entity table 302) or automatically generated based on various factors or concepts (e.g., topics, events, places, celebrities, space/time proximity, media sources, breaking news, etc.). A user may create a "personal story" in the form of a collection of media content items that has been created and sent/broadcast by that user. To this end, the user interface of the messaging client application 104 may include an icon that is user-selectable to enable a sending user to add specific media content items to his or her personal story.

A collection may also constitute a "live story," which is a collection of media content items from multiple users that is created manually, automatically, or using a combination of manual and automatic techniques. For example, a "live story" may constitute a curated stream of user-submitted media content items from various locations and events. Users whose client devices have location services enabled and are at a common location event at a particular time may, for example, be presented with an option, via a user interface of the messaging client application 104, to contribute media content items to a particular live story. The live story may be identified to the user by the messaging client application 104, based on his or her location. The end result is a "live story" told from a community perspective.

A further type of media content item collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
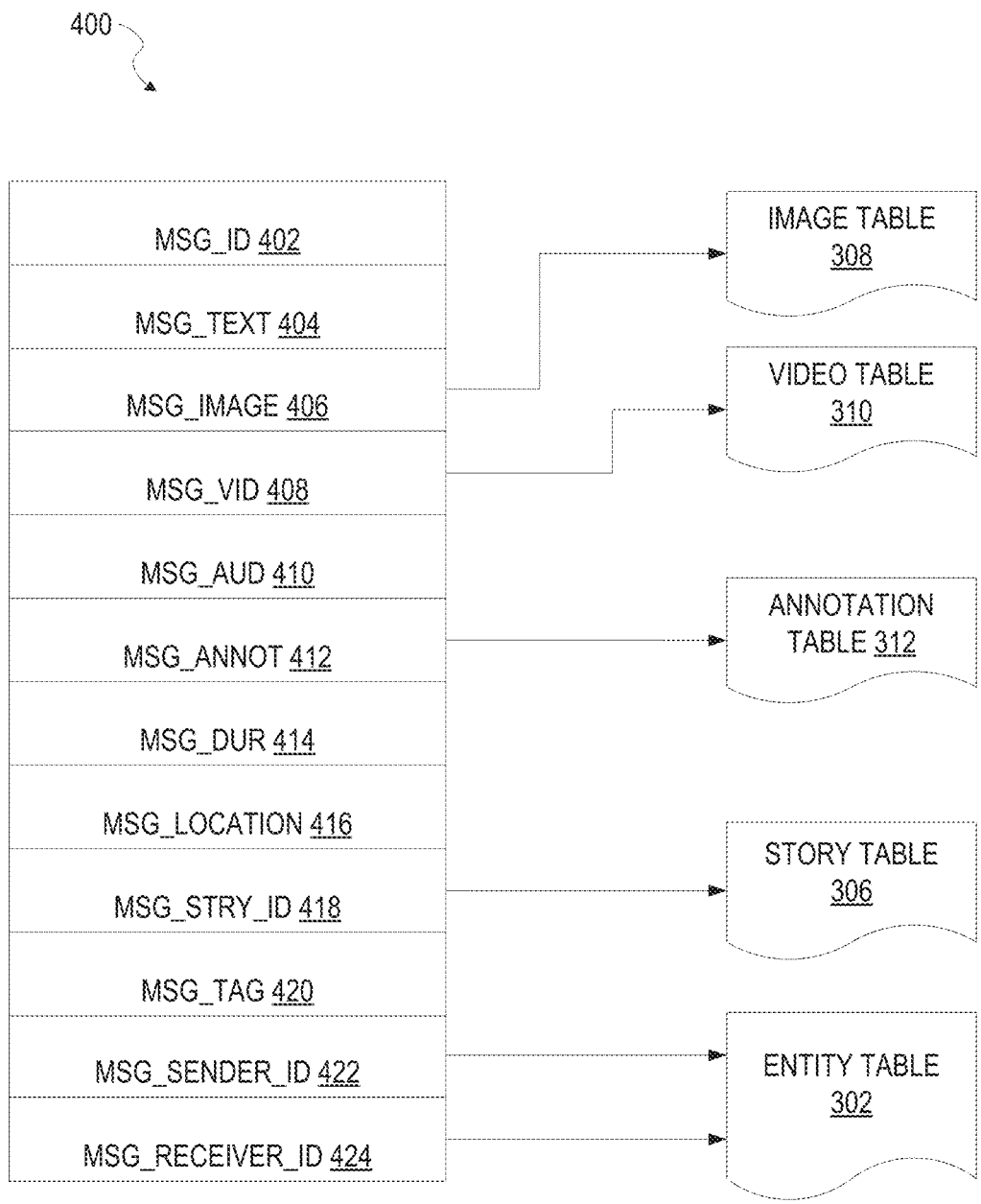
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotation 412: annotation data (e.g., filters, stickers, texture fills, or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to media content items included in the content (e.g., a specific image within the message image payload 406, or a specific video in the message video payload 408).

A message story identifier 418: identifier values identifying one or more media content item collections (e.g., "stories") with which a particular media content item in the message image payload 406 of the message 400 is associated. For example, multiple images within the message image payload 406 may each be associated with multiple media content item collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
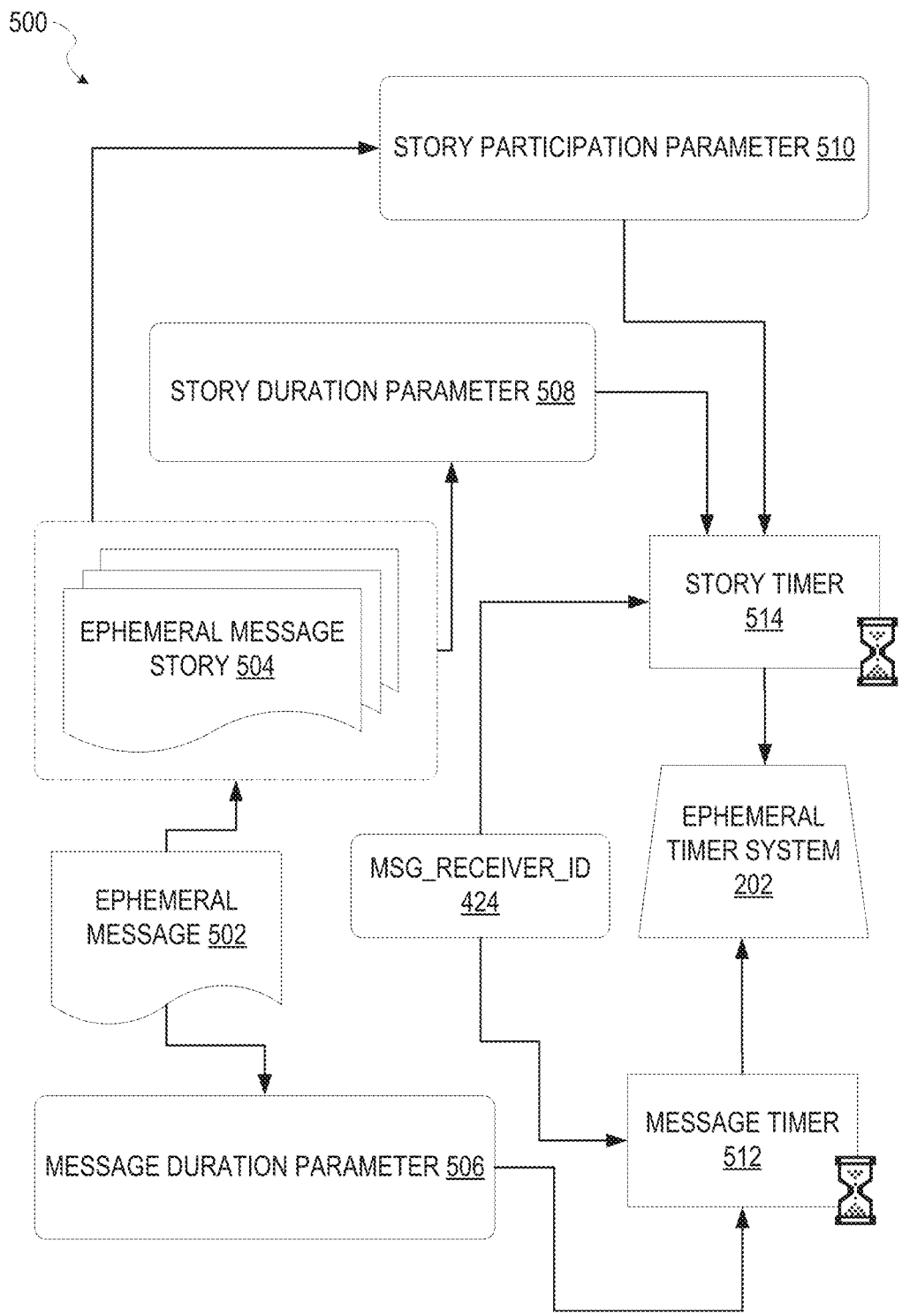
FIG. 5 is a schematic diagram illustrating an example access-limiting process, in terms of which access to media content item (e.g., an ephemeral message and associated multimedia payload of data) or a media content item collection (e.g., an ephemeral message story) may be time-limited (e.g., made ephemeral).

FIG. 5 is a schematic diagram illustrating an access-limiting process 500, in terms of which access to a media content item (e.g., an ephemeral message 502, and associated multimedia payload of data) or a media content item collection (e.g., an ephemeral message story 504) may be time-limited (e.g., made ephemeral). Though the access-limiting process 500 is described below with respect to the ephemeral message 502 and the ephemeral message story 504, for the access-limiting process 500 can be applied to another type of media content item or collection of media content items, such as a collection of media content items annotated by an embodiment described herein.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of media content items pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504.

Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
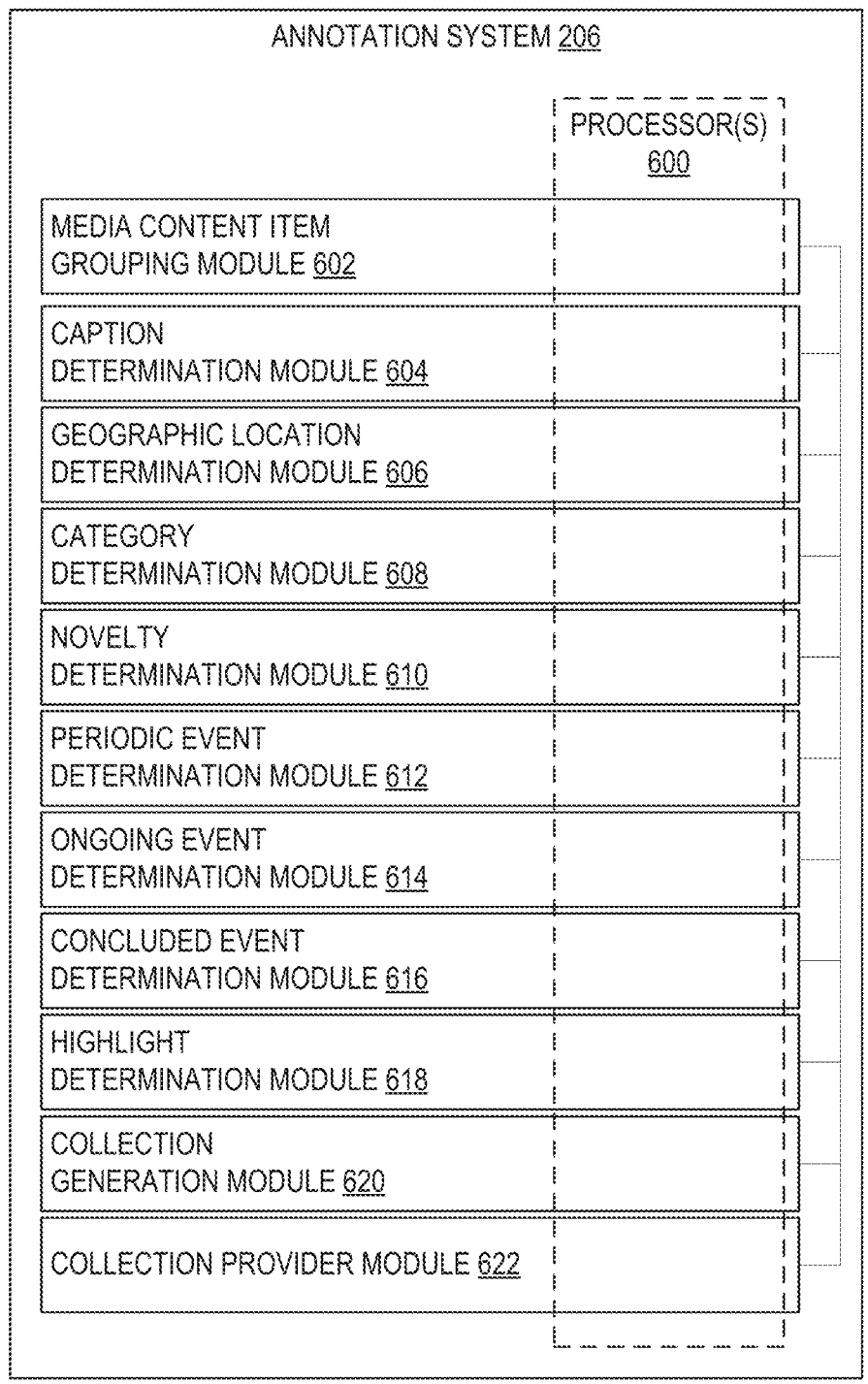
FIG. 6 is a block diagram illustrating various modules of an annotation system, according to some embodiments.

FIG. 6 is a block diagram illustrating various modules of an annotation system 206, according to some embodiments. The annotation system 206 is shown as including a media content item grouping module 602, a caption determination module 604, a geographic location determination module 606, a category determination module 608, a novelty determination module 610, a periodic event determination module 612, an ongoing event determination module 614, a concluded event determination module 616, a highlight determination module 618, a collection generation module 620, and a collection provider module 622. The various modules of the annotation system 206 are configured to communicate with each other (e.g., via a bus, shared memory, or a switch). Any one or more of these modules may be implemented using one or more processors 600 (e.g., by configuring such one or more processors 600 to perform functions described for that module) and hence may include one or more of the processors 600.

Any one or more of the modules described may be implemented using hardware alone (e.g., one or more of the computer processors of a machine, such as machine 1000) or a combination of hardware and software. For example, any described module of the annotation system 206 may physically include an arrangement of one or more of the processors 600 (e.g., a subset of or among the one or more processors of the machine, such the machine 1000) configured to perform the operations described herein for that module. As another example, any module of the annotation system 206 may include software, hardware, or both, that configure an arrangement of one or more processors 600 (e.g., among the one or more processors of the machine, such as the machine 1000)) to perform the operations described herein for that module. Accordingly, different modules of the annotation system 206 may include and configure different arrangements of such processors 600 or a single arrangement of such processors 600 at different points in time. Moreover, any two or more modules of the annotation system 206 may be combined into a single module, and the functions described herein for a single module may be subdivided among multiple modules. Furthermore, according to various embodiments, modules described herein as being implemented within a single machine, database, or device may be distributed across multiple machines, databases, or devices.

The media content item grouping module 602 identifies a plurality of media content items. According to some embodiments, the plurality of media content items is identified by grouping (e.g., clustering) specific media content items based on one or more factors or concepts. Example factors/concepts can include, without limitation, topics, events, places, celebrities, space/time proximity, media sources, breaking news, and the like. For instance, specific media content items may be grouped into a plurality of media content items based on: proximity of geographic locations associated with the specific media content items; proximity of times associated with the specific media content items; topics associated with the specific media content items; media sources associated with the specific media content items; or media types associated with the specific media content items. Depending on the embodiments, the plurality of media content items may be identified by the media content item grouping module 602 from a larger plurality of media content items, which may be stored on a datastore (e.g., database) that collects media content items from a plurality of users (e.g., through their respective client devices 102). For instance, the larger plurality of media content items (from which the plurality of media content items is identified by the module 602) may comprise media content items posted to an online service, such as a social network platform, by users of the online service.

The plurality of media content items may be identified by the media content item grouping module 602 automatically, which may occur on a periodic basis (e.g., every fifteen to forty minutes) or near real-time basis. The plurality of media content items may be identified as part of a dynamic collection pipeline that gathers together media content items from one or more sources into coherent groups (e.g., coherent clusters) based on, for example, a topic (e.g., popular topic, fresh topic, widespread topic, breaking news, fashion, sports, etc.), a visual feature, proximity of space (e.g., at or around a similar geographic location, such as places with centroids less than 200 m apart), proximity of time (e.g., same time, same day, same day of the week, etc.), quality (e.g., quality of user providing the media content item or quality of the media content item), or some combination thereof.

The caption determination module 604 determines a particular caption (e.g., particular caption phrase) for a plurality of media content items. According to some embodiments, the particular caption is determined by extracting a set of captions from the plurality of media content items and selecting the particular caption from the set of captions. In this way, the caption determination module 604 can determine a best caption to describe or represent the plurality of media content items.

For some embodiments, the caption determination module 604 extracts, from the plurality of media content items, a set of captions associated with one or more individual media content items in the plurality of media content items. Subsequently, the caption determination module 604 ranks captions in the set of captions by scoring one or more captions in the set of captions. The scoring of an individual caption (e.g., comprising a single word or a phrase) may be determined, for example, based on popularity of the individual caption within the plurality of media content items, uniqueness of the individual caption within the plurality of media content items, popularity of individual terms within the individual caption, independence of the individual caption within the plurality of media content items, or some combination thereof. For some embodiments, one or more of these factors are utilized to assign scores to individual captions extracted from the plurality of media content items. Thereafter, a scored caption having the highest rank (e.g., based on its assigned score) may be determined (e.g., selected) by the caption determination module 604 as the particular caption for the plurality of media content items.

The popularity of the individual caption within the plurality of media content items may be determined by the caption determination module 604 based on the number of media content items in the plurality that are associated with the individual caption, based on the number of users providing the media content items in the plurality (e.g., users who posted media content items to a social networking platform that are now included in the plurality) who have used the individual caption with respect to media content items not in the plurality (e.g., other media content items the users posted on the social network platform), or a combination of both.

The uniqueness of the individual caption within the plurality of media content items may be determined by the caption determination module 604 based on how frequently the individual caption is used for media content items associated with different geographic locations and different times, historical data on media content item submissions (e.g., historical media content item postings to a social networking platform), or a combination of both.

The popularity of individual terms within the individual caption may be determined by the caption determination module 604 based on media content items in the plurality of media content items that are not associated with the individual caption but that are associated with a caption that includes at least some (but not all) of the individual caption (e.g., sub-phrases of the individual caption). The popularity of individual terms may be determined by determining how many media content items in the plurality of media content items satisfy such a condition.

The independence of the individual caption, within the plurality of media content items, can indicate how sufficient the individual caption is in describing the majority of the media content items in the plurality. The caption determination module 604 may consider all the media content items in the plurality associated with a given caption that includes the individual caption and assign each of those associations a coverage score (e.g., between 0 and 1) that measures how much of the given caption is covered by the individual caption. The independence of the individual caption may be defined based on the distribution of coverage scores. A high independence score (e.g., independence score close to 1) may represent that the individual caption is typically used as a full caption when associated with a media content item in the plurality, whereas a low independence score (e.g., independence score close to 0) may represent that the individual caption is typically used along with other terms or phrases to form a full snap caption.

The geographic location determination module 606 determines a particular geographic location for the plurality of media content items. As used herein, a geographic location can comprise a physical location associated with geographic coordinates or a place identified by a place type (e.g., business establishment, restaurant, coffee shop, library, shopping mall, park, etc.) or a proper name (e.g., STARBUCKS, MCDONALDS, EIFFEL TOWER, WALMART, STAPLES CENTER, etc.). According to some embodiments, the particular geographic location is determined by the geographic location determination module 606 using a place recognition model that can infer where a particular media content item was created or captured based on processing visual content (e.g., digital image) included in the media content item. The place recognition model may be trained on a place dataset (e.g., comprising digital images and associated identifiers for different places), which enables it to identify a learned place based on what is depicted in a new digital image. Additionally, the particular geographic location is determined by the geographic location determination module 606 using metadata included by one or more media content items of the plurality of media content items.

The category determination module 608 determines a particular category (e.g., concert, sports game, fashion show, animal story, food, party, politics, protest, breaking news, etc.) for the plurality of media content items. According to some embodiments, the particular category is determined based on analysis (e.g., statistical analysis) of a set of visual labels identified for the plurality of media content items, based on analysis (e.g., statistical analysis) of at least one caption in a set of captions extracted from the plurality of media content items, or a combination of both. The set of visual labels (e.g., building, vehicle, grass, etc.) may be identified for a media content item by using a machine learning system (e.g., deep neural network model) that can identify an object or a concept appearing in visual content (e.g., digital image or video) of the media content item. For some embodiments, the category determination module 608 uses caption/visual label representations (e.g., vectors) for categories to determine the particular category for the plurality of media content items.

For example, a caption/visual label representation for a given category may be formed by determining captions and visual labels relevant to the given category and determining their individual relevance scores. The process for determining this may comprise identifying captions and visual labels relevant to the given category from media content items or collections of media content items known or identified to be related to the given category, and extracting and aggregating captions or visual labels from known/identified media content items and collections. A caption/visual label representation may be formed for each possible category that can be associated with the plurality of media content items.

Additionally, caption counts may be determined for each caption extracted from the plurality of media content items, and the resulting caption counts may be aggregated such that each caption count for a given caption is weighted based on the uniqueness of that given caption. This aggregation can result in a caption/visual label representation for the plurality of media content items.

Subsequently, for each possible category, the caption/visual label representation for the plurality of media content items is compared against the caption/visual label representation of the possible category. Eventually, the category determination module 608 can determine (e.g., select) the possible categories having the smallest caption/visual label representation difference (e.g., vector difference) with the caption/visual label representation for the plurality of media content items.

The novelty determination module 610 determines a novelty measurement for the plurality of media content items. According to some embodiments, the novelty measurement is determined based on at least one caption in a set of captions extracted from the plurality of media content items, or based on at least one visual label in a set of visual labels identified for the plurality of media content items.

For example, the novelty measurement of the plurality of media content items can be determined by the novelty determination module 610 based on an aggregation of novelty measurements of individual captions in the set of captions, individual visual labels in the set of visual labels of the plurality of media content items, or both. The novelty measurement of individual captions or visual labels can be determined by the novelty determination module 610 determining a frequency of new media content items (e.g., those newly posted to a social networking platform by various users), across different time horizons (e.g., past twenty-four hours, average daily count in past week, same day last week, etc.), associated with the individual captions and visual labels. Based on determined frequencies of the new media content items (associated with the individual captions and visual labels), the novelty determination module 610 can determine a ratio of frequencies, corresponding to different time periods, that can represent a novelty measurement. For instance, for a given caption, a ratio of the twenty-four hour frequency of new media content items (associated with the given caption) to the average daily frequency of new media content items (associated with the given caption) can determine the novelty of the given caption.

The periodic event determination module 612 determines whether the plurality of media content items is associated with a periodic event (e.g., an event that occurs repeatedly on a periodic basis). Initially, the periodic event determination module 612 may determine that the plurality of media content items is associated with a particular event based on, for example, at least one caption extracted from the plurality of media content items, or at least one visual label identified for the plurality of media content items. For example, the periodic event determination module 612 may use a model that can recognize an event (e.g., party, concert, protest, etc.) based on visual content from the plurality of media content items. Once the particular event has been determined for the plurality of media content items, the periodic event determination module 612 can determine whether the particular event is a periodic event.

According to some embodiments, the periodic event determination module 612 determines whether the plurality of media content items is associated with a periodic event based on a similarity of at least one caption, in the set of captions, to a given caption of one or more other media content items associated with the periodic event. Additionally, for some embodiments, the periodic event determination module 612 determines whether the plurality of media content items is associated with a periodic event based on a similarity of at least one visual label, in the set of visual labels, to a given visual label of the one or more other media content items associated with the periodic event. For example, the periodic event determination module 612 may check whether one or more captions or visual labels of the plurality of media content items are similar to the captions and visual labels corresponding to media content items taken at the same geographic location or at (or around) the same time of the day (e.g., over the past several days or past week) as the plurality of media content items.

The ongoing event determination module 614 determines whether the plurality of media content items is associated with an ongoing event. Initially, the ongoing event determination module 614 may determine that the plurality of media content items is associated with a particular event based on, for example, at least one caption extracted from the plurality of media content items, or at least one visual label identified for the plurality of media content items. For example, the ongoing event determination module 614 may use a model that can recognize an event (e.g., party, concert, protest, etc.) based on visual content from the plurality of media content items. Once the particular event has been determined for the plurality of media content items, the ongoing event determination module 614 can determine whether the particular event is an ongoing event.

According to some embodiments, the ongoing event determination module 614 determines whether the plurality of media content items is associated with an ongoing event based on a trend of media content items being added to the plurality of media content items over a period of time. For instance, the ongoing event determination module 614 may determine a trend based on a number (e.g., volume) of new media content items (e.g., those newly posted to a social networking platform by various users). Additionally, an increasing or approximately stable number can signal that an event associated with the plurality of media content items is an ongoing event.

The concluded event determination module 616 determines whether the collection of media is further associated with a concluded event. Initially, the concluded event determination module 616 may determine that the plurality of media content items is associated with a particular event based on, for example, at least one caption extracted from the plurality of media content items, or at least one visual label identified for the plurality of media content items. For example, the concluded event determination module 616 may use a model that can recognize an event (e.g., party, concert, protest, etc.) based on visual content from the plurality of media content items. Once the particular event has been determined for the plurality of media content items, the concluded event determination module 616 can determine whether the particular event is an ongoing event.

According to some embodiments, the concluded event determination module 616 determines that the plurality of media content items is associated with a concluded event in response to the ongoing event determination module 614 determining that the plurality of media content items is not associated with an ongoing event.

For some embodiments, the concluded event determination module 616 determines whether the plurality of media content items is associated with a concluded event based on a trend of media content items being added to the plurality of media content items over a period of time. For instance, the concluded event determination module 616 may determine a trend based on a number (e.g., volume) of new media content items (e.g., those newly posted to a social networking platform by various users). Additionally, a decreasing number can signal that an event associated with the plurality of media content items is a concluded event (or soon to conclude event).

The highlight determination module 618 determines a set of highlight media content items for the plurality of media content items. According to some embodiments, the set of highlight media content items is selected, from the plurality of media content items, based on a set of scores determined for each individual media content item in the plurality of media content items, which can then be combined to determine a combined score for each individual media content item. For example, the highlight determination module 618 may determine the set of highlight media content items by determining for individual media content items in the plurality of media content items: a score representing how cohesive or representative (e.g., in terms of topics or visual labels) the individual media content item is with respect to the plurality of media content items; a score representing how descriptive the captions or tags (e.g., place tags) associated with the individual media content item are with respect to the plurality of media content items; or a score representing how many media content items similar to those of the individual media content item appear in the plurality of media content items. Additionally, the highlight determination module 618 may determine the set of highlight media content items by determining, for individual media content items in the plurality of media content items: a score representing whether the individual media content item meets with a user or system preference (e.g., video content items preferred); or a score representing a quality of the individual media content item.

For an individual media content item in the plurality of media content items, the highlight determination module 618 can determine a score representing how cohesive or representative (e.g., in terms of topics or visual labels) the individual media content item is with respect to the plurality of media content items. In doing so, an individual media content item associated with a "musician" visual label or with a caption including the term "musician" can be preferred as a highlight media content item for a collection of media content items associated with a concert event.

For some embodiments, a pre-compiled set of visual labels that is common or interesting with respect to a given type of event is used by the highlight determination module 618. For example, for a concert event, the pre-compiled set of visual labels can include such visual labels as "musician," "drummer," "guitarist," "bassist," and "backup singer," which reflect a preference for highlight media content items that depict such visual content for collections associated with a concert event. Accordingly, a score determined by the highlight determination module 618 can represent whether the individual media content item is associated with at least one visual label included by the pre-compiled set of visual labels.

Similarly, for some embodiments, a pre-compiled set of relevant terms that is common or interesting with respect to a given event or a given type of event is used by the highlight determination module 618. For instance, for a football game, the pre-compiled set of relevant terms can include such terms as "touchdown" or "Super Bowl," which reflects a preference for highlight media content items associated with a football game event. Accordingly, a score determined by the highlight determination module 618 can represent whether the individual media content item is associated with at least one term included by the pre-compiled set of relevant terms.

For an individual media content item in the plurality of media content items, the highlight determination module 618 can determine a score representing how descriptive the captions or tags (e.g., place tags) associated with the individual media content item are with respect to the plurality of media content items based on the uniqueness of a caption associated with the individual media content item, based on whether the individual media content item has a geo-filter, based on whether the individual media content item has a venue filter, or some combination thereof.

For an individual media content item in the plurality of media content items, the highlight determination module 618 can determine a score representing how many media content items similar to those of the set of highlight media content items appear in the plurality of media content items based on aggregated similarity of media content items in the plurality of media content items to the individual media content item (e.g., similarity with respect to a time, a geographic location, a caption, or visual feature).

For an individual media content item in the plurality of media content items, the highlight determination module 618 can determine a score representing a quality of the individual media content item by determining a creator quality score representing user interactions with media content items posted by a user providing the individual media content item. Additionally, the highlight determination module 618 can determine a score representing a quality of the individual media content item by determining a media quality score for the individual media content item based on input signals of the individual media content item, which can be used to filter out individual media content items that are, for example, too dark, too bright, too shaky, blurry, or lack valuable visual content.

For some embodiments, determining the set of highlight media content items by the highlight determination module 618 comprises selecting a cover media content item, from the set of highlight media content items, that will represent the plurality of media content items as a collection of media content items accessible by a client device associated with a user. For example, to represent the plurality of media content items as a collection, at least some portion of the cover media content item may be used to generate a graphical tile that can be presented to a user on a graphical user interface (e.g., displayed on a client device 102 associated with the user) as the representation of the collection. The cover media content item may be selected from the set of highlight media content items by scoring media content items in the set of highlight media content items, and selecting the cover media content item based on the resulting scores (e.g., cover media content item corresponding to the highest score). The components for scoring a given highlight media content item can include, without limitation: original score that resulted in the given highlight media content item being included in the set of highlight media content items; representativeness of visual features (e.g., visual labels) of the given highlight media content item relative to the plurality of media content items (e.g., what the story is generally about); or one or more user or system preferences for media content items (e.g., preferences for non-selfie media content items and non-captioned media content items). Representativeness of visual features of the given highlight media content item relative to the plurality of media content items may be determined by measuring a cosine similarity of aggregated visual labels of the plurality of media content items to visual labels of the given highlight media content item.

The collection generation module 620 generates a collection of media content items that comprises the plurality of media content items and collection annotation data that at least associates the collection with (if not also stores) determined associations, such as those determined by various components of the annotation system 206 (e.g., the caption determination module 604, the geographic location determination module 606, the category determination module 608, the novelty determination module 610, the periodic event determination module 612, the ongoing event determination module 614, the concluded event determination module 616, and the highlight determination module 618).

The collection generation module 620 may generate a collection of media content items by generating one or more data structures (e.g., data records in the story table 306) that represent the collection of media content items. The annotations determined by the various components of the annotation system 206 may be stored in data structure separate from data structure for collections of media content items (e.g., store annotations as records in the annotation table 312). By generating and storing the data structures, some embodiments store the collection of media content items for future access (e.g., by users of client devices 102). For instance, a set of data records generated (e.g., in the story table 306) for the collection of media content items can comprise a set of identifiers that identify individual media content items that make up the collection, and can comprise data storing, representing, or associating (with the collection) annotations determined by the various components of the annotation system 206 (e.g., data records in the story table 306 refer to records in the annotation table 312 that store annotations associated with collections).

For example, the collection annotation data may at least associate the collection with the particular caption determined by the caption determination module 604. The collection annotation data may at least associate the collection with the particular geographic location determined by the geographic location determination module 606. The collection annotation data may at least associate the collection with the particular category determined by the category determination module 608. The collection annotation data may at least associate the collection with the novelty measurement determined by the novelty determination module 610. The collection annotation data may at least associate the collection with a periodic event in response to the periodic event determination module 612 determining that the collection is associated with the ongoing event. The collection annotation data may at least associate the collection with an ongoing event in response to the ongoing event determination module 614 determining that the collection is associated with the ongoing event. The collection annotation data may at least associate the collection with a concluded event in response to the concluded event determination module 616 determining that the collection is associated with the concluded event. The collection annotation data may at least associate the collection with the set of highlight media content items determined by the highlight determination module 618.

The collection provider module 622 provides the collection of media content items, generated by the collection generation module 620, to a client device (e.g., the client device 102) for access by a user at the client device. Depending on the embodiment, the collection provider module 622 may make the collection of media content items generated by the collection generation module 620 available for access by the client device. The providing, for instance, may comprise publishing the collection of media content items to an online service accessible (e.g., a social networking platform) by the client device. Additionally, the providing may comprise transmitting some or all of the collection of media content items to the client device for local storage at the client device and subsequent viewing.

For example, the collection of media content items generated by the collection generation module 620 may be stored with the messaging server system 108. In response to a request from the client device 102 to the message server system 108, the stored collection of media content items may be provided (e.g., transmitted in whole or in part) from the message server system 108 to the client device 102 for access at the client device 102 by a user (e.g., for viewing through a graphical user interface presented by the messaging client application 104). In another example, the collection of media content items may be published to an online resource, such as a website, which may be accessible by one or more users through their associated client devices. In some instances, the collection of media content items may be provided by the collection provider module 622 as a story or gallery, which may comprise such as a collection of messages or ephemeral messages.

Figure 7:
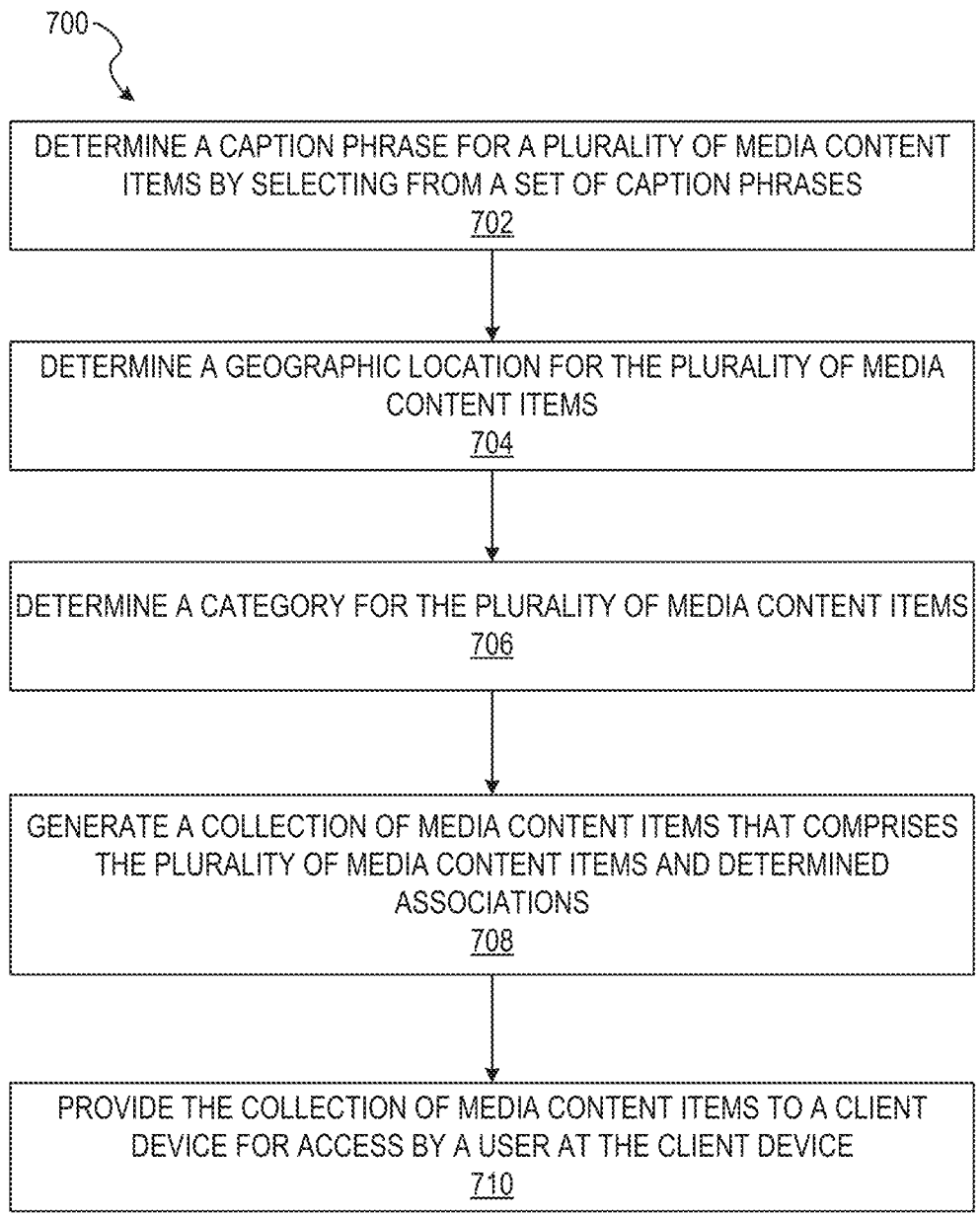
FIGS. 7 and 8 are flowcharts illustrating methods for annotating a collection of media content items, according to certain embodiments.

FIG. 7 is a flowchart illustrating a method 700 for annotating a collection of media content items, according to certain embodiments. The method 700 may be embodied in computer-readable instructions for execution by one or more computer processors such that the operations of the method 700 may be performed in part or in whole by the messaging server system 108 or, more specifically, the annotation system 206 of the messaging server application 116. Accordingly, the method 700 is described below by way of example with reference to the annotation system 206. At least some of the operations of the method 700 may be deployed on various other hardware configurations, and the method 700 is not intended to be limited to being operated by the messaging server system 108. Though the steps of method 700 may be depicted and described in a certain order, the order in which the steps are performed may vary between embodiments. For example, a step may be performed before, after, or concurrently with another step. Additionally, the components described above with respect to the method 700 are merely examples of components that may be used with the method 700, and that other components may also be utilized, in some embodiments.

At operation 702, the caption determination module 604 determines a particular caption for a plurality of media content items. According to some embodiments, the particular caption is determined by extracting a set of captions from the plurality of media content items and selecting the particular caption from the set of captions. For instance, the set of captions can be extracted from the plurality of media content items, a set of scores for the set of the set of captions can be determined, a ranking for the set of captions can be determined based on the set of scores, and the particular caption can be selected from the set of captions based on the ranking.

At operation 704, the geographic location determination module 606 determines a particular geographic location for the plurality of media content items. As used herein, a geographic location can comprise a physical location associated with geographic coordinates or a place identified by a place type (e.g., business establishment, restaurant, coffee shop, library, shopping mall, park, etc.) or a proper name (e.g., STARBUCKS, MCDONALDS, EIFFEL TOWER, WALMART, STAPLES CENTER, etc.).

At operation 706, the category determination module 608 determines a particular category for the plurality of media content items. According to some embodiments, the particular category is determined based on a set of visual labels identified for the plurality of media content items, analysis of at least one caption in a set of captions extracted from the plurality of media content items, or both.

At operation 708, the collection generation module 620 generates a collection of media content items that comprises the plurality of media content items and collection annotation data that at least associates the collection with (if not also stores) determined associations, such as those determined by one or more operations 702, 704, 706. For example, the collection annotation data may at least associate the collection with the particular caption determined by operation 702. The collection annotation data may at least associate the collection with the particular geographic location determined by operation 704. The collection annotation data may at least associate the collection with the particular category determined by operation 706.

At operation 710, the collection provider module 622 provides the collection of media content items, generated by operation 708, to a client device (e.g., the client device 102) for access by a user at the client device. Depending on the embodiment, the collection provider module 622 may make the collection of media content items generated by operation 708 available for access by the client device. The providing, for instance, may comprise publishing the collection of media content items to an online service accessible (e.g., a social networking platform) by the client device. Additionally, the providing may comprise transmitting some or all of the collection of media content items to the client device for local storage at the client device and subsequent viewing.

Figure 8:
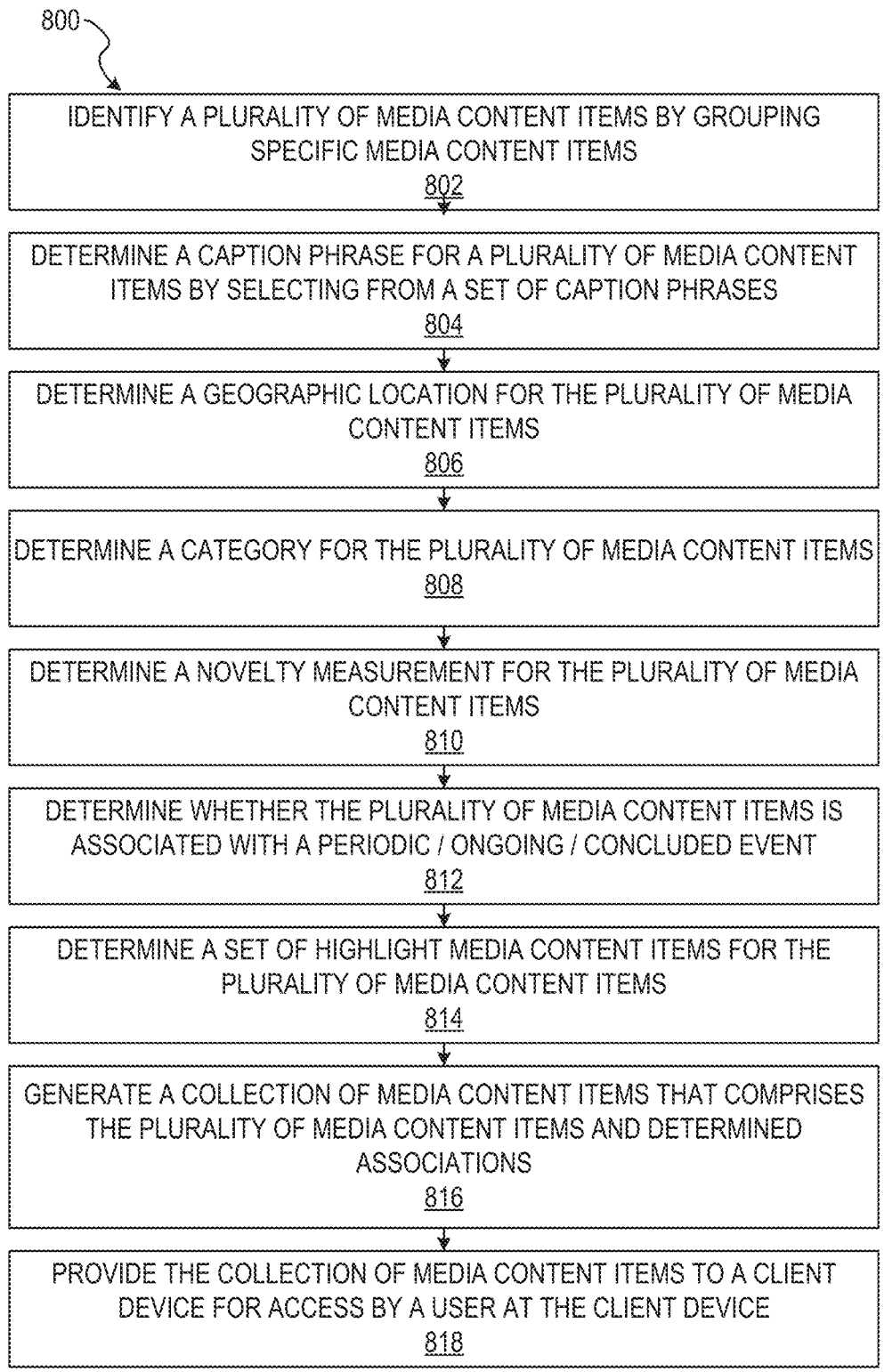

FIG. 8 is a flowchart illustrating a method 800 for annotating a collection of media content items, according to certain embodiments. The method 800 may be embodied in computer-readable instructions for execution by one or more computer processors such that the operations of the method 800 may be performed in part or in whole by the messaging server system 108 or, more specifically, the annotation system 206 of the messaging server application 116. Accordingly, the method 800 is described below by way of example with reference to the annotation system 206. At least some of the operations of the method 800 may be deployed on various other hardware configurations, and the method 800 is not intended to be limited to being operated by the messaging server system 108. Though the steps of method 800 may be depicted and described in a certain order, the order in which the steps are performed may vary between embodiments. For example, a step may be performed before, after, or concurrently with another step. Additionally, the components described above with respect to the method 800 are merely examples of components that may be used with the method 800, and that other components may also be utilized, in some embodiments.

At operation 802, the media content item grouping module 602 identifies a plurality of media content items. According to some embodiments, the plurality of media content items is identified by grouping (e.g., clustering) specific media content items based on one or more factors or concepts. Example factors/concepts can include, without limitation, topics, events, places, celebrities, space/time proximity, media sources, breaking news, and the like.

At operation 804, the caption determination module 604 determines a particular caption for a plurality of media content items. For some embodiments, operation 804 is similar to operation 702 of the method 700 described above with respect to FIG. 7.

At operation 806, the geographic location determination module 606 determines a particular geographic location for the plurality of media content items. For some embodiments, operation 806 is similar to operation 704 of the method 700 described above with respect to FIG. 7.

At operation 808, the category determination module 608 determines a particular category for the plurality of media content items. For some embodiments, operation 808 is similar to operation 706 of the method 700 described above with respect to FIG. 7.

At operation 810, the novelty determination module 610 determines a novelty measurement for the plurality of media content items. According to some embodiments, the novelty measurement is determined based on at least one caption in a set of captions extracted from the plurality of media content items, or based on at least one visual label in a set of visual labels identified for the plurality of media content items.

At operation 812, the modules 612, 614 and 616 determine an event for the plurality of media content items. According to some embodiments, determining the event comprises the periodic event determination module 612 determining whether the plurality of media content items is associated with a periodic event (e.g., an event that occurs repeatedly on a periodic basis). The periodic event determination module 612 may determine whether the plurality of media content items is associated with a periodic event based on a similarity of at least one caption, in the set of captions, to a given caption of one or more other media content items associated with the periodic event. The periodic event determination module 612 may determine whether the plurality of media content items is associated with a periodic event based on a similarity of at least one visual label, in the set of visual labels, to a given visual label of the one or more other media content items associated with the periodic event.

According some embodiments, determining the event comprises the ongoing event determination module 614 determining whether the plurality of media content items is associated with an ongoing event. The ongoing event determination module 614 may determine whether the plurality of media content items is associated with an ongoing event based on a trend of media content items being added to the plurality of media content items over a period of time. For some embodiments, determining the event comprises the concluded event determination module 616 determining whether the collection of media is further associated with a concluded event.

At operation 814, the highlight determination module 618 determines a set of highlight media content items for the plurality of media content items. According to some embodiments, the set of highlight media content items is selected, from the plurality of media content items, based on a set of scores determined for individual media content items in the plurality of media content items.

At operation 816, the collection generation module 620 generates a collection of media content items that comprises the plurality of media content items and collection annotation data that at least associates the collection with (if not also stores) determined associations, such as those determined by one or more of operations 804, 806, 808, 810, 812, 814. For example, the collection annotation data may at least associate the collection with the particular caption determined by operation 804. The collection annotation data may at least associate the collection with the particular geographic location determined by operation 806. The collection annotation data may at least associate the collection with the particular category determined by operation 808. The collection annotation data may at least associate the collection with the novelty measurement determined by operation 810. The collection annotation data may at least associate the collection with a periodic event in response to operation 812 determining that the collection is associated with the ongoing event. The collection annotation data may at least associate the collection with an ongoing event in response to operation 812 determining that the collection is associated with the ongoing event. The collection annotation data may at least associate the collection with a concluded event in response to operation 812 determining that the collection is associated with the concluded event. The collection annotation data may at least associate the collection with the set of highlight media content items determined by operation 814. For some embodiments, operation 816 is similar to operation 708 of the method 700 described above with respect to FIG. 7.

At operation 818, the collection provider module 622 provides the collection of media content items, generated by operation 816, to a client device (e.g., the client device 102) for access by a user at the client device. For some embodiments, operation 818 is similar to operation 710 of the method 700 described above with respect to FIG. 7.

Figure 9:
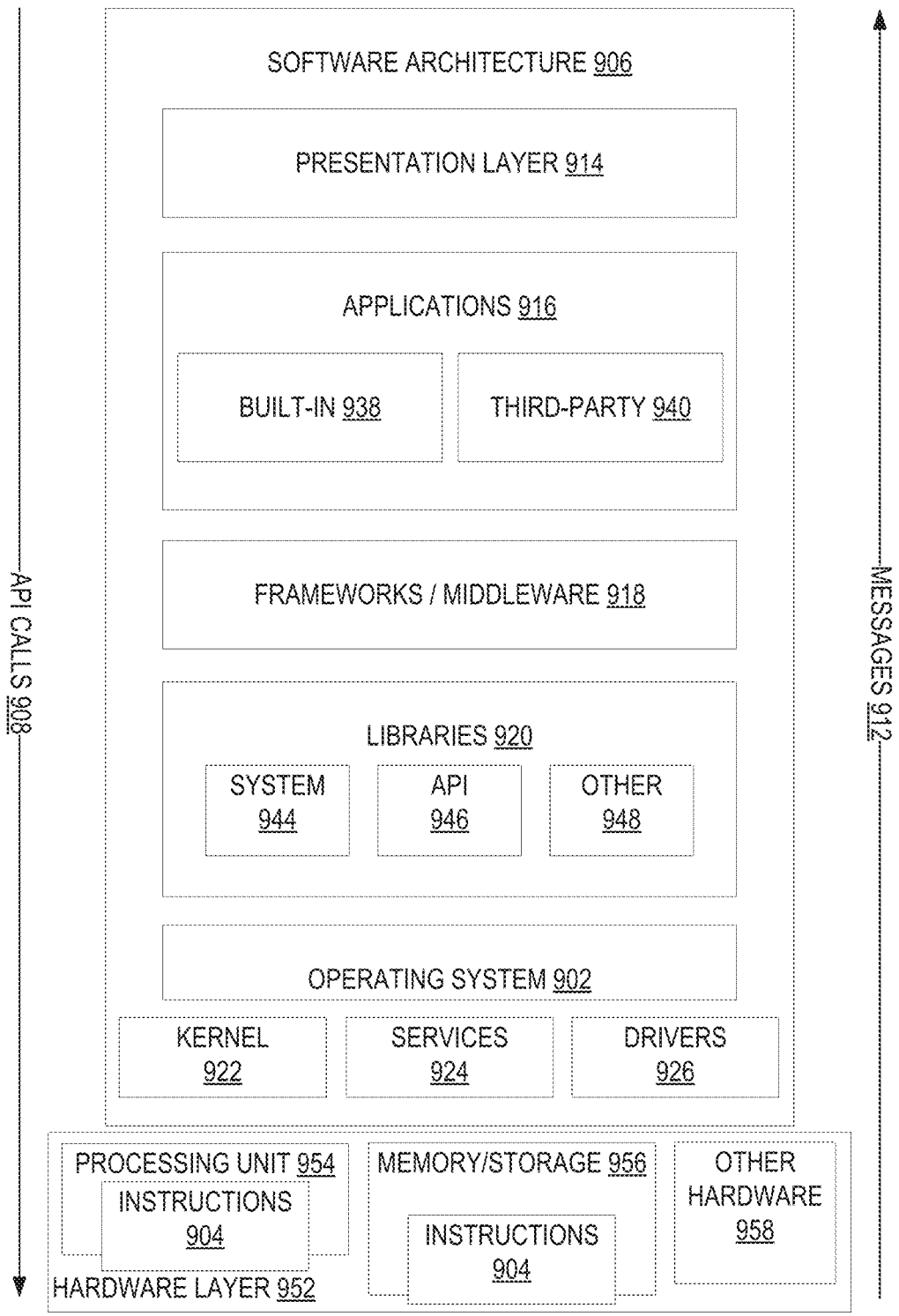
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory/storage 1006, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916, and a presentation layer 914. Operationally, the applications 916 or other components within the layers may invoke application programming interface (API) calls 908 through the software stack and receive a response in the example form of messages 912 to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 or other components or layers. The libraries 920 provide functionality that allows other software components to perform tasks in an easier fashion than to interface directly with the underlying operating system 902 functionality (e.g., kernel 922, services 924, or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 or other software components/modules. For example, the frameworks/middleware 918 may provide various graphic user interface (GUI) functions, high-level resource management, high-level location services, and so forth. The frameworks/middleware 918 may provide a broad spectrum of other APIs that may be used by the applications 916 or other software components/modules, some of which may be specific to a particular operating system 902 or platform.

The applications 916 include built-in applications 938 or third-party applications 940. Examples of representative built-in applications 938 may include, but are not limited to, a contacts application, a browser application, a book reader application, a location application, a media application, a messaging application, or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, or drivers 926), libraries 920, and frameworks/middleware 918 to create user interfaces to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
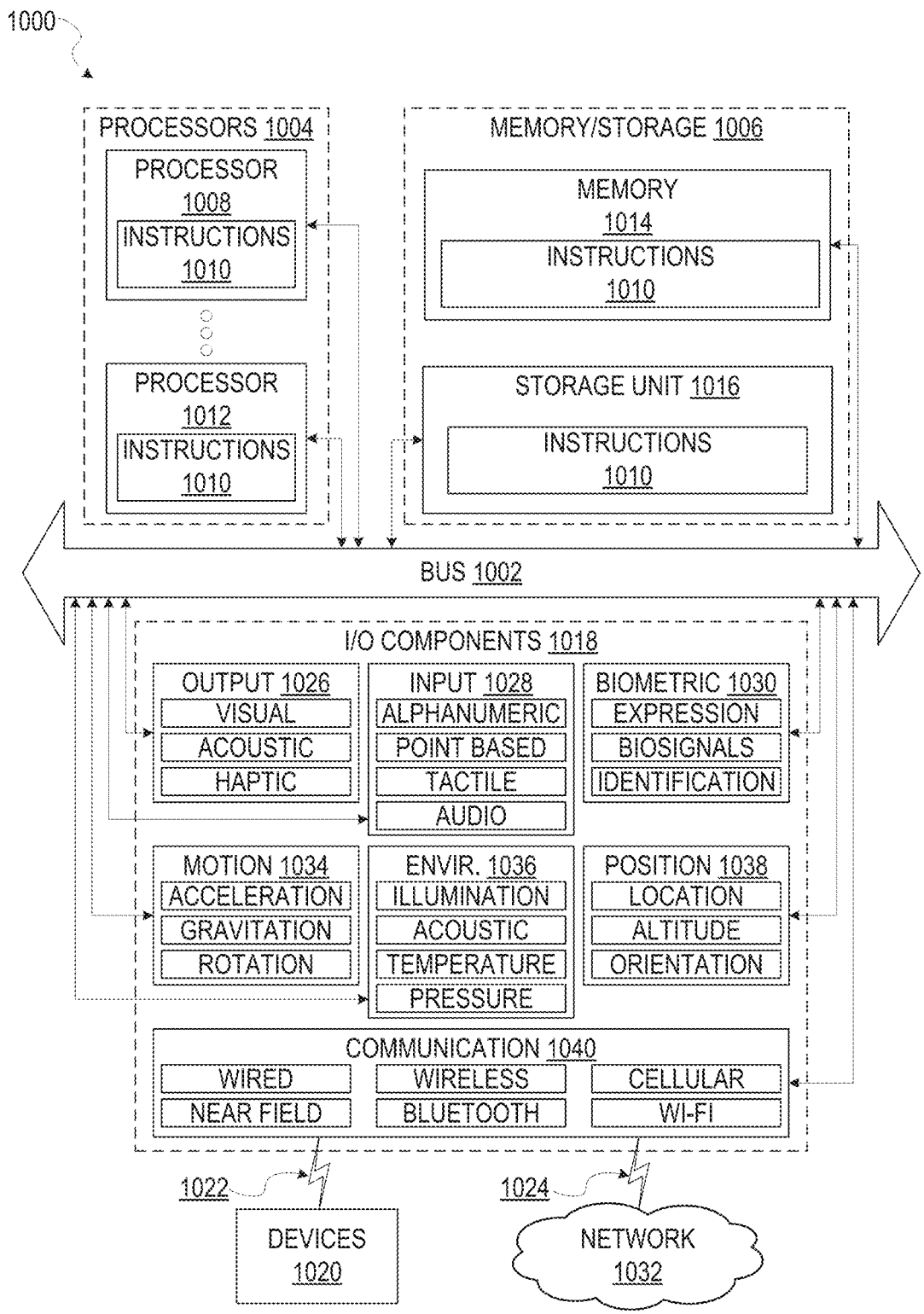
FIG. 10 is a block diagram illustrating components of a machine, according to some embodiments, able to read instructions from a machine-readable medium (e.g., a machine-readable storage medium) and perform any one or more of the methodologies discussed herein.

FIG. 10 is a block diagram illustrating components of a machine 1000, according to some embodiments, able to read instructions from a machine-readable medium (e.g., a computer-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further embodiments, the I/O components 1018 may include biometric components 1030, motion components 1034, environmental components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

As used herein, "ephemeral message" can refer to a message (e.g., message item) that is accessible for a time-limited duration (e.g., maximum of 10 seconds). An ephemeral message may comprise a text content, image content, audio content, video content and the like. The access time for the ephemeral message may be set by the message sender or, alternatively, the access time may be a default setting or a setting specified by the recipient. Regardless of the setting technique, an ephemeral message is transitory. A message duration parameter associated with an ephemeral message may provide a value that determines the amount of time that the ephemeral message can be displayed or accessed by a receiving user of the ephemeral message. An ephemeral message may be accessed or displayed using a messaging client software application capable of receiving and displaying content of the ephemeral message, such as an ephemeral messaging application.

As also used herein, "ephemeral message story" can refer to a collection of ephemeral message content items that is accessible for a time-limited duration, similar to an ephemeral message. An ephemeral message story may be sent from one user to another, and may be accessed or displayed using a messaging client software application capable of receiving and displaying the collection of ephemeral message content items, such as an ephemeral messaging application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various embodiments, one or more computer systems or one or more hardware modules thereof may be configured by software (e.g., an application or portion thereof) as a hardware module that operates to perform operations described herein for that module.

In some embodiments, a hardware module may be implemented electronically. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor.

Considering embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   determining, by one or more processors, a set of scores for a plurality of media content items by determining an individual score for an individual media content item in the plurality of media content items;
   selecting, by the one or more processors, a set of highlight media content items from the plurality of media content items based on the set of scores;
   determining, by the one or more processors, an individual caption for the plurality of media content items, the determining of the individual caption comprising:

extracting, from the plurality of media content items, a set of captions associated with one or more individual media content items in the plurality of media content items;
determining a set of caption scores for the set of captions by assigning a select caption score for each select caption in the set of captions, at least one caption in the set of captions being assigned an individual caption score based on an independence of the at least one caption within the plurality of media content items by:
determining a distribution of coverage scores, the determining of the distribution of coverage scores comprising assigning, for each individual media content item in the plurality of media content items associated with a given caption that includes the at least one caption, a coverage score that measures how much of the given caption is covered by the at least one caption; and
determining the independence of the at least one caption based on the distribution of coverage scores, the independence indicating how sufficient the at least one caption is in describing a majority of the media content items in the plurality of media content items, the at least one caption comprising a phrase;
determining a ranking for the set of captions based on the set of caption scores; and
selecting, from the set of captions, the individual caption based on the ranking;
generating, by the one or more processors, a collection of media content items that comprises the plurality of media content items, the individual caption, and collection annotation data, the collection annotation data associating the collection of media content items with the set of highlight media content items; and
providing, by the one or more processors, the collection of media content items to a client device for access by a user at the client device, one or more media content items from the set of highlight media content items being used to generate a graphical tile on the client device, the graphical tile being used to graphically represent the collection of media content items on the client device.

2. The method of claim 1, wherein the individual caption score is a first caption score, and wherein at least another caption in the set of captions is assigned a second caption score based on at least one of:
a popularity of the select caption within the plurality of media content items; or
a uniqueness of the select caption within the plurality of media content items.

3. The method of claim 1, comprising:
identifying, by the one or more processors, the plurality of media content items by grouping specific media content items based on at least one of proximity of geographic locations associated with the specific media content items, proximity of times associated with the specific media content items, topics associated with the specific media content items, media sources associated with the specific media content items, or media types associated with the specific media content items.

4. The method of claim 1, comprising:
determining, by the one or more processors, whether the plurality of media content items is associated with a periodic event based on at least one of:
a similarity of at least one caption, in a set of captions extracted from the plurality of media content items, to a given caption of one or more other media content items associated with the periodic event; or
a similarity of at least one visual label, in a set of visual labels identified for the plurality of media content items, to a given visual label of the one or more other media content items associated with the periodic event;
the collection annotation data at least associating the collection of media content items with the periodic event in response to determining that the plurality of media content items is associated with the periodic event.

5. The method of claim 1, comprising:
determining, by the one or more processors, whether the plurality of media content items is associated with an ongoing event based on a trend of media content items being added to the plurality of media content items over a period of time, the collection annotation data at least associating the collection of media content items with the ongoing event in response to determining that the plurality of media content items is associated with the ongoing event.

6. The method of claim 1, comprising:
determining, by the one or more processors, whether the collection of media content items is associated with a concluded event, the collection annotation data at least associating the collection of media content items with the concluded event in response to determining that the plurality of media content items is associated with the concluded event.

7. The method of claim 1, wherein the assigning of the select caption score for the select caption is based on a popularity of the select caption within the plurality of media content items, the popularity being determined based on at least one of:
a number of media content items in the plurality of media content items that are associated with the select caption; or
a number of users providing one or more media content items in the plurality of media content items who have used the select caption with respect to media content items not in the plurality of media content items.

8. A system comprising:
one or more processors; and
one or more machine-readable mediums storing instructions that, when executed by the one or more processors, cause the one or more processors to perform operations comprising:
determining a set of scores for a plurality of media content items by determining an individual score for an individual media content item in the plurality of media content items;
selecting a set of highlight media content items from the plurality of media content items based on the set of scores;
determining an individual caption for the plurality of media content items, the determining of the individual caption comprising:
extracting, from the plurality of media content items, a set of captions associated with one or more individual media content items in the plurality of media content items;
determining a set of caption scores for the set of captions by assigning a select caption score for each select caption in the set of captions, at least one caption in the set of captions being assigned an individual caption score based on an independence of the at least one caption within the plurality of media content items, the independence indicating how sufficient the at least one caption is in describing a majority of the media content items in the plurality of media content items by:

determining a distribution of coverage scores, the determining of the distribution of coverage scores comprising assigning, for each individual media content item in the plurality of media content items associated with a given caption that includes the at least one caption, a coverage score that measures how much of the given caption is covered by the at least one caption; and determining the independence of the at least one caption based on the distribution of coverage scores, the at least one caption comprising a phrase;

determining a ranking for the set of captions based on the set of caption scores; and selecting, from the set of captions, the individual caption based on the ranking;

generating a collection of media content items that comprises the plurality of media content items, the individual caption, and collection annotation data, the collection annotation data associating the collection of media content items with the set of highlight media content items; and providing the collection of media content items to a client device for access by a user at the client device, one or more media content items from the set of highlight media content items being used to generate a graphical tile on the client device, the graphical tile being used to graphically represent the collection of media content items on the client device.

9. The system of claim 8, wherein the individual caption score is a first caption score, and wherein at least another caption in the set of captions is assigned a second caption score based on at least one of:

a popularity of the select caption within the plurality of media content items; or a uniqueness of the select caption within the plurality of media content items.

10. The system of claim 8, wherein the operations comprise: identifying the plurality of media content items by grouping specific media content items based on at least one of proximity of geographic locations associated with the specific media content items, proximity of times associated with the specific media content items, topics associated with the specific media content items, media sources associated with the specific media content items, or media types associated with the specific media content items.

11. The system of claim 8, wherein the operations comprise:

determining whether the plurality of media content items is associated with a periodic event based on at least one of:

a similarity of at least one caption, in a set of captions extracted from the plurality of media content items, to a given caption of one or more other media content items associated with the periodic event; or a similarity of at least one visual label, in a set of visual labels identified for the plurality of media content items, to a given visual label of the one or more other media content items associated with the periodic event;

the collection annotation data at least associating the collection of media content items with the periodic event in response to determining that the plurality of media content items is associated with the periodic event.

12. The system of claim 8, wherein the operations comprise:

determining whether the plurality of media content items is associated with an ongoing event based on a trend of media content items being added to the plurality of media content items over a period of time, the collection annotation data at least associating the collection of media content items with the ongoing event in response to determining that the plurality of media content items is associated with the ongoing event.

13. A non-transitory computer-readable medium storing instructions that, when executed by one or more computer processors, cause the one or more computer processors to perform operations comprising:

determining a set of scores for a plurality of media content items by determining an individual score for an individual media content item in the plurality of media content items;

selecting a set of highlight media content items from the plurality of media content items based on the set of scores;

determining an individual caption for the plurality of media content items, the determining of the individual caption comprising:

extracting, from the plurality of media content items, a set of captions associated with one or more individual media content items in the plurality of media content items;

determining a set of caption scores for the set of captions by assigning a select caption score for each select caption in the set of captions, at least one caption in the set of captions being assigned an individual caption score based on an independence of the at least one caption within the plurality of media content items, the independence indicating how sufficient the at least one caption is in describing a majority of the media content items in the plurality of media content items by:

determining a distribution of coverage scores, the determining of the distribution of coverage scores comprising assigning, for each individual media content item in the plurality of media content items associated with a given caption that includes the at least one caption, a coverage score that measures how much of the given caption is covered by the at least one caption; and determining the independence of the at least one caption based on the distribution of coverage scores, the at least one caption comprising a phrase;

determining a ranking for the set of captions based on the set of caption scores; and selecting, from the set of captions, the individual caption based on the ranking;

generating a collection of media content items that comprises the plurality of media content items, the individual caption, and collection annotation data, the collection annotation data associating the collection of media content items with the set of highlight media content items; and providing the collection of media content items to a client device for access by a user at the client device, one or more media content items from the set of highlight media content items being used to generate a graphical tile on the client device, the graphical tile being used to graphically represent the collection of media content items on the client device.

14. The non-transitory computer-readable medium of claim 13, wherein the individual caption score is a first caption score, and wherein at least another caption in the set of captions is assigned a second caption score based on at least one of:

a popularity of the select caption within the plurality of media content items; or a uniqueness of the select caption within the plurality of media content items.

15. The non-transitory computer-readable medium of claim 13, wherein the operations comprise:

identifying the plurality of media content items by grouping specific media content items based on at least one of proximity of geographic locations associated with the specific media content items, proximity of times associated with the specific media content items, topics associated with the specific media content items, media sources associated with the specific media content items, or media types associated with the specific media content items.

16. The non-transitory computer-readable medium of claim 13, wherein the operations comprise:

determining whether the plurality of media content items is associated with a periodic event based on at least one of:

a similarity of at least one caption, in a set of captions extracted from the plurality of media content items, to a given caption of one or more other media content items associated with the periodic event; or a similarity of at least one visual label, in a set of visual labels identified for the plurality of media content items, to a given visual label of the one or more other media content items associated with the periodic event;

the collection annotation data at least associating the collection of media content items with the periodic event in response to determining that the plurality of media content items is associated with the periodic event.

17. The non-transitory computer-readable medium of claim 13, wherein the operations comprise:

determining whether the plurality of media content items is associated with an ongoing event based on a trend of media content items being added to the plurality of media content items over a period of time, the collection annotation data at least associating the collection of media content items with the ongoing event in response to determining that the plurality of media content items is associated with the ongoing event.

\* \* \* \* \*